United States Patent
Sugie et al.

(10) Patent No.: US 10,093,266 B2
(45) Date of Patent: Oct. 9, 2018

(54) OCCUPANT PROTECTING DEVICE

(71) Applicant: TOYOTA JIDOSHA KABUSHIKI KAISHA, Toyota-shi, Aichi-ken (JP)

(72) Inventors: Kazuki Sugie, Miyoshi (JP); Masanobu Ohmi, Kasugai (JP); Seiji Yamamoto, Seto (JP); Yoshiaki Matsumura, Toyota (JP); Kosuke Sakakibara, Toyota (JP); Misato Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/429,582

(22) Filed: Feb. 10, 2017

(65) Prior Publication Data

US 2017/0297524 A1 Oct. 19, 2017

(30) Foreign Application Priority Data

Apr. 13, 2016 (JP) ................................. 2016-080414

(51) Int. Cl.
*B60R 21/207* (2006.01)
*B60R 21/015* (2006.01)
(Continued)

(52) U.S. Cl.
CPC .......... *B60R 21/207* (2013.01); *B60R 21/013* (2013.01); *B60R 21/01554* (2014.10);
(Continued)

(58) Field of Classification Search
CPC ................ B60R 21/207; B60R 21/013; B60R 21/01554; B60R 21/233; B60R 2021/0048; B60R 2021/2074
See application file for complete search history.

(56) References Cited

U.S. PATENT DOCUMENTS 3,953,049 A * 4/1976 Surace .................... B60R 21/08
280/730.1
6,157,881 A * 12/2000 Wessels .............. B60R 21/0132
180/274
(Continued)

FOREIGN PATENT DOCUMENTS

DE 102005001177 A1 9/2005
DE 102009001209 A1 9/2010
(Continued)

OTHER PUBLICATIONS

Mar. 8, 2018 Office Action issued in German Patent Application No. 102017103063.8.

*Primary Examiner* — Drew J Brown
(74) *Attorney, Agent, or Firm* — Oliff PLC (57) ABSTRACT

An occupant protecting device including: a seat provided in a vehicle, the seat including a seat cushion, a seat back, and a headrest, and the seat being provided with an air bag that inflates and deploys at least to a front and both of left and right sides of a head of a seated occupant; and a control device that in the case of having detected or predicted a collision of the vehicle, causes the air bag to inflate and deploy, and in the case that the seat is facing an opposite side to a collision side when the collision has been detected or predicted, delays a timing of causing the air bag to inflate and deploy more compared to in the case that the seat is facing the collision side.

10 Claims, 8 Drawing Sheets

(51) Int. Cl.
  *B60R 21/013* (2006.01)
  *B60R 21/233* (2006.01)
  *B60R 21/00* (2006.01)
  *B60R 21/01* (2006.01)
(52) U.S. Cl.
  CPC .... *B60R 21/233* (2013.01); *B60R 2021/0048* (2013.01); *B60R 2021/01231* (2013.01); *B60R 2021/2074* (2013.01); *B60R 2021/23308* (2013.01)

(56) References Cited

U.S. PATENT DOCUMENTS

| | | | | |
|---|---|---|---|---|
| 8,985,622 | B1* | 3/2015 | Cannon | B60R 21/231 280/730.2 |
| 9,533,651 | B1* | 1/2017 | Ohno | B60R 21/23138 |
| 9,744,932 | B1* | 8/2017 | Faruque | B60R 21/16 |
| 9,789,840 | B2* | 10/2017 | Farooq | B60N 2/14 |
| 2005/0156411 | A1 | 7/2005 | Steffens et al. | |
| 2009/0210117 | A1 | 8/2009 | Oowada | |
| 2013/0015642 | A1 | 1/2013 | Islam et al. | |
| 2013/0093224 | A1* | 4/2013 | Dainese | B60R 21/207 297/216.12 |
| 2014/0300088 | A1* | 10/2014 | Fukawatase | B60R 21/13 280/729 |
| 2014/0327234 | A1* | 11/2014 | Heurlin | B60R 21/207 280/730.1 |
| 2016/0082915 | A1* | 3/2016 | Madaras | B60R 21/231 297/216.2 |
| 2016/0121839 | A1* | 5/2016 | Ko | B60R 21/233 280/730.1 |
| 2016/0272141 | A1* | 9/2016 | Ohmura | B60R 21/01554 |

FOREIGN PATENT DOCUMENTS

| | | |
|---|---|---|
| JP | H10-324221 A | 12/1998 |
| JP | 2000-344044 A | 12/2000 |
| JP | 2009-220803 A | 10/2009 |
| JP | 2009-241643 A | 10/2009 |
| JP | 2013-018378 A | 1/2013 |
| WO | 2016-174785 A1 | 11/2016 |

* cited by examiner

FIG.8

OCCUPANT PROTECTING DEVICE

CROSS-REFERENCE TO RELATED APPLICATIONS

This application is based on and claims priority under 35 USC 119 from Japanese Patent Application No. 2016-080414 filed on Apr. 13, 2016, the disclosure of which is incorporated by reference herein.

BACKGROUND

Technical Field

The present disclosure relates to an occupant protecting device.

Related Art

In an air bag device of an automobile described in Japanese Patent Application Laid-Open Publication No. 2000-344044, a gas supply pipe projecting upwardly of a seat back is fixed to the seat back. A bag (air bag) is attached to this gas supply pipe. This air bag is supplied with a gas via the gas supply pipe during a collision and inflates and deploys to a front and both of left and right sides of a head of an occupant. As a result, the head of the occupant is surrounded from the front, rear, left, and right by the air bag and a headrest, and is thereby protected.

In the air bag device of the above-described configuration, the head of the occupant is surrounded from the front, rear, left, and right by the air bag and the headrest as described above, hence the head of the occupant can be protected against various forms of collisions.

However, behavior of the occupant during the collision differs according to an orientation of a seat with respect to a collision direction, hence air bag deployment control appropriate to the collision direction is required.

SUMMARY

In view of the above-described facts, the present disclosure provides an occupant protecting device that, by a configuration of a seat provided with an air bag that inflates and deploys at least to a front and both of left and right sides of a head of an occupant, can protect the head of the occupant with an appropriate timing depending on an orientation of a seat with respect to a collision direction of a vehicle.

An occupant protecting device of a first mode of the present disclosure includes: a seat provided in a vehicle, the seat including a seat cushion, a seat back, and a headrest, and the seat being provided with an air bag that inflates and deploys at least to a front and both of left and right sides of a head of a seated occupant; and a control device that in the case of having detected or predicted a collision of the vehicle, causes the air bag to inflate and deploy, and in the case that the seat is facing an opposite side to a collision side when the collision has been detected or predicted, delays a timing of causing the air bag to inflate and deploy more compared to in the case that the seat is facing the collision side.

Note that "timing" is a timing that internal pressure of the air bag becomes maximum.

As a result of the first mode of the present disclosure, a seat is provided with an air bag that inflates and deploys at least to a front and both of left and right sides of a head of a seated occupant. This air bag is inflated and deployed in the case that a control device has detected or predicted a collision of a vehicle. Now, in the case that the seat is facing an opposite side to a collision side (hereafter, sometimes referred to as an "anti-collision side") during the collision of the vehicle, an upper body of the occupant, after having once moved to a seat back and headrest side (collision side), moves (rebounds) to the anti-collision side due to a reaction force from a seat back and headrest. Therefore, in the case that the seat is facing the anti-collision side, a timing that the head of the occupant should be protected by the air bag becomes later compared to in the case that the seat is facing the collision side. In this respect, in the case that the seat is facing the anti-collision side when the above-described control device has detected or predicted the collision, the above-described control device delays a timing of causing the air bag to inflate and deploy more compared to in the case that the seat is facing the collision side. As a result, the head of the occupant can be protected by the air bag with an appropriate timing.

In an occupant protecting device of a second mode of the present disclosure, with respect to the first mode, the seat is configured such that at least its front-rear orientation can be changed with respect to the vehicle, and the control device includes a seat direction detecting sensor that detects the orientation of the seat with respect to the vehicle.

As a result of the second mode of the present disclosure, the seat is configured such that at least its front-rear orientation can be changed with respect to the vehicle, and the orientation of the seat with respect to the vehicle is detected by a seat direction detecting sensor included in the control device. Now, in the case that, for example, the seat is disposed orientated to a rear of the vehicle when the vehicle has made a front face collision, the timing that the control device causes the air bag to inflate and deploy becomes later compared to in the case that the seat is disposed orientated to a front of the vehicle. As a result, an occupant of a seat disposed orientated to the rear of the vehicle can be protected by the air bag with an appropriate timing.

In an occupant protecting device of a third mode of the present disclosure, with respect to the first mode, the device includes a plurality of the seats, at least one of the plurality of seats is configured such that at least its front-rear orientation can be changed with respect to the vehicle, and the control device includes a seat direction detecting sensor that detects the orientation of the at least one seat with respect to the vehicle.

As a result of the third mode of the present disclosure, a plurality of the seats provided with the previously mentioned air bag are provided in the vehicle. Moreover, at least one of the plurality of seats is configured such that at least its front-rear orientation can be changed with respect to the vehicle, and the orientation of the above-described at least one seat with respect to the vehicle is detected by a seat direction detecting sensor included in the control device. Now, in the case that, for example, the above-described at least one seat is disposed orientated to a rear of the vehicle and another seat is disposed orientated to a front of the vehicle when the vehicle has made a front face collision, the control device causes the air bag of the above-described at least one seat to inflate and deploy later than the air bag of the above-described other seat. As a result, rise of internal pressure in a vehicle interior can be suppressed more compared to in the case that all of the air bags inflate and deploy simultaneously.

In an occupant protecting device of a fourth mode of the present disclosure, with respect to any of the first through third modes, the control device delays the timing of causing the air bag to inflate and deploy by delaying an actuation timing of an inflator supplying a gas for inflation to the air bag.

As a result of the fourth mode of the present disclosure, in the case that the seat is facing the anti-collision side when the control device has detected or predicted a collision of the vehicle, the control device delays an actuation timing of an inflator more compared to in the case that the seat is facing the collision side. As a result, timing of inflation and deployment of the air bag can be delayed by a simple configuration.

An occupant protecting device of a fifth mode of the present disclosure includes: a seat provided in a vehicle, the seat being provided with an air bag that inflates and deploys at least to a front and both of left and right sides of a head of a seated occupant; and a control device that in the case of having detected or predicted a collision of the vehicle, causes the air bag to inflate and deploy, and changes a timing of causing the air bag to inflate and deploy depending on an orientation of the seat with respect to a direction of the detected or predicted collision.

As a result of the fifth mode of the present disclosure, a seat is provided with an air bag that inflates and deploys at least to a front and both of left and right sides of a head of a seated occupant. This air bag is inflated and deployed in the case that a control device has detected or predicted a collision of a vehicle. This control device changes a timing of causing the air bag to inflate and deploy depending on an orientation of the seat with respect to a direction of the detected or predicted collision. As a result, the head of the occupant can be protected by the air bag with an appropriate timing depending on the orientation of the seat with respect to the collision direction.

As described above, in the occupant protecting device according to the present disclosure, by a configuration of a seat provided with an air bag that inflates and deploys at least to a front and both of left and right sides of a head of an occupant, the head of the occupant can be protected with an appropriate timing depending on an orientation of the seat with respect to a collision direction of a vehicle.

BRIEF DESCRIPTION OF THE DRAWINGS

Exemplary embodiments of the present disclosure will be described in detail based on the following figures, wherein.

DETAILED DESCRIPTION

<First Embodiment>

An occupant protecting device 10 according to a first embodiment of the present disclosure will be described based on FIGS. 1 to 4. Note that in each of the drawings, reference symbols are sometimes appropriately omitted. Moreover, an arrow FR, an arrow UP, and an arrow IN appropriately marked in each of the drawings indicate, respectively, a frontward direction, an upward direction, and an inward direction in a vehicle width direction of an automobile V which is a vehicle to which the occupant protecting device 10 has been applied. Hereafter, when description is made using simply directions of front/rear, up/down, and left/right, unless otherwise specifically stated, these are assumed to indicate front/rear in a front-rear direction of the vehicle, up/down in an up-down direction of the vehicle, and left/right in a left-right direction of the vehicle (vehicle width direction).

Figure 1:
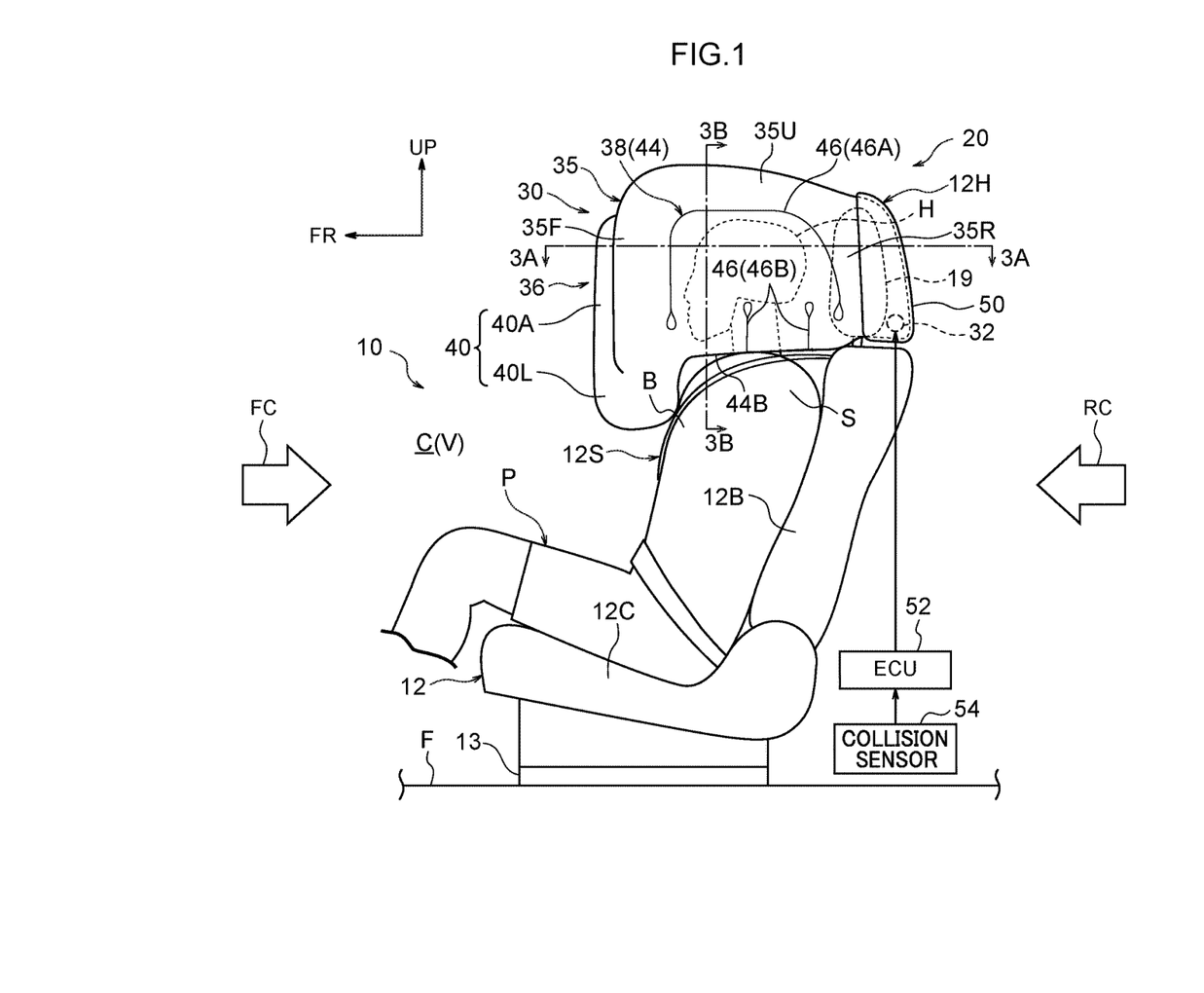
FIG. 1 is a side view of inside a cabin of an automobile applied with an occupant protecting device according to a first embodiment of the present disclosure, seen from a left side of a vehicle, and is a view showing a state where a multidirectional air bag has been inflated and deployed.
Figure 2:
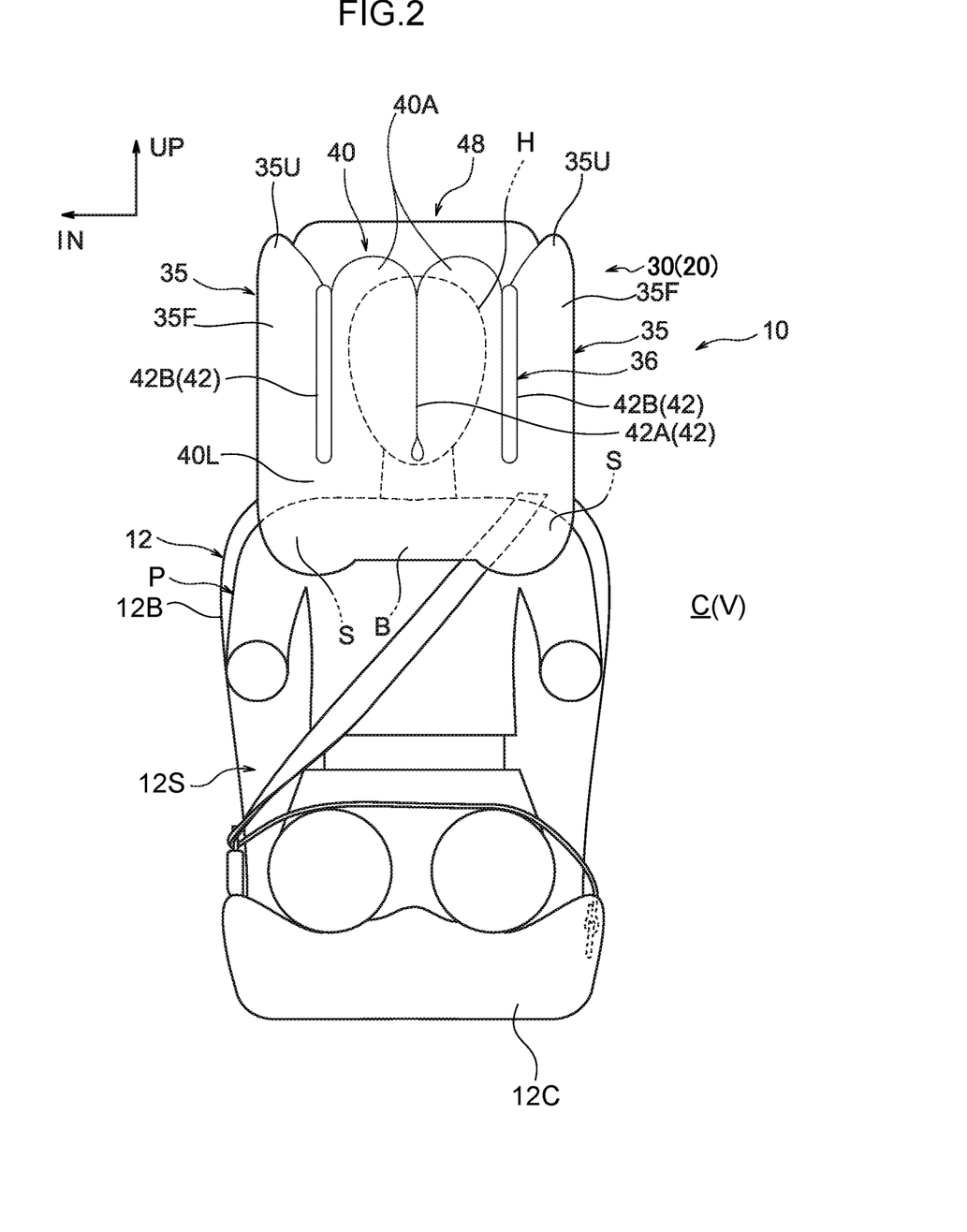
FIG. 2 is a front view showing an inflated and deployed state of the same multidirectional air bag.
Figure 3A:
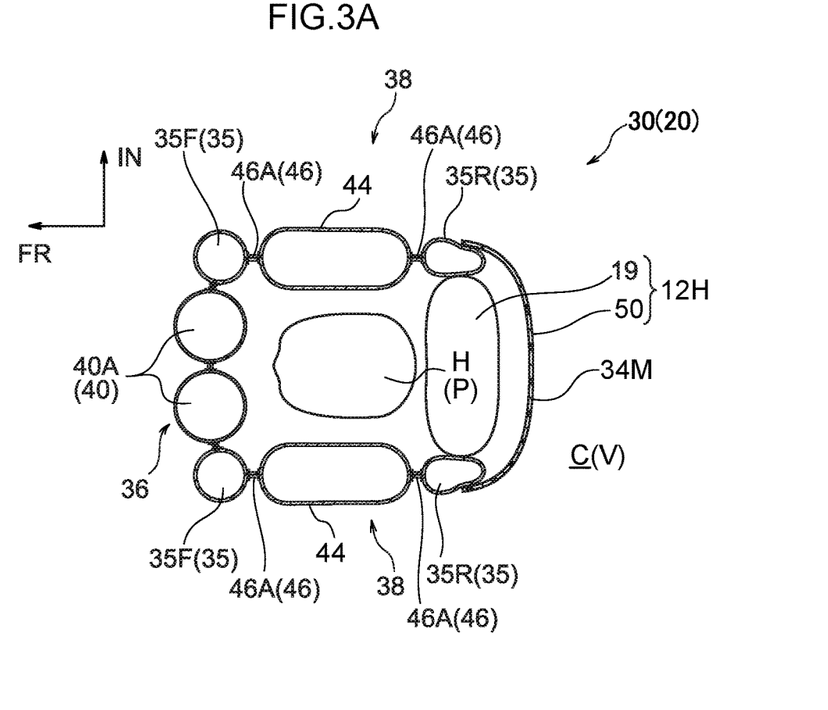
FIG. 3A is a cross-sectional view showing a section taken along the line 3A-3A of FIG. 1.
Figure 3B:
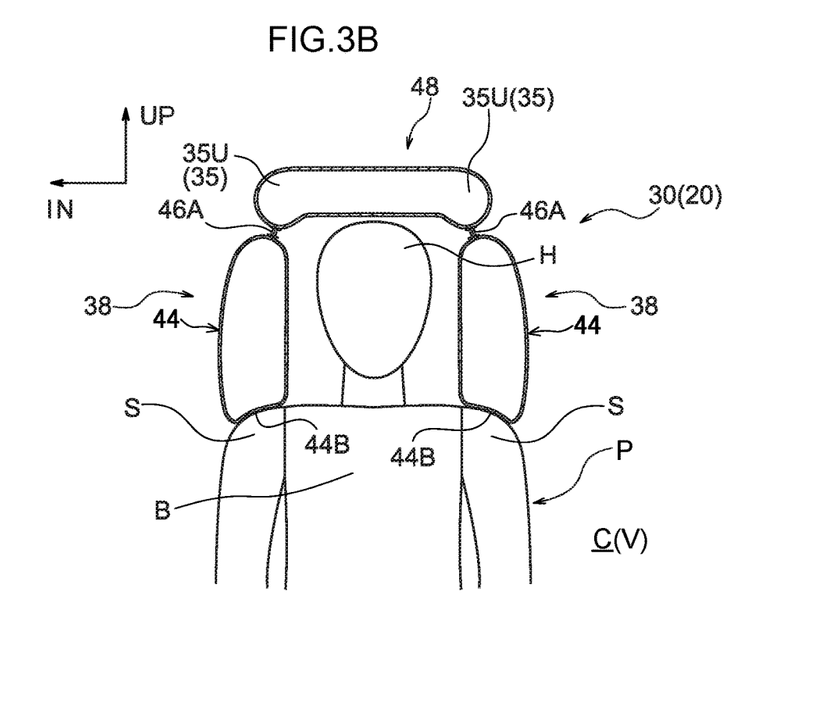
FIG. 3B is a cross-sectional view showing a section taken along the line 3B-3B of FIG. 1.

FIG. 1 shows a side view of inside a cabin (vehicle interior) C of the automobile V applied with the occupant protecting device 10. As shown in this drawing, the occupant protecting device 10 includes a seat (vehicle-dedicated seat) 12 and an occupant protecting ECU 52 which is a control device, that are provided in the automobile V. The seat 12 is provided with a multidirectional air bag device 20. Hereafter, each of the above-described configuring elements will be specifically described.

(Configuration of Seat)

The seat 12 is configured as, for example, a driving seat of the automobile V, and is disposed in a front part of inside the cabin C. This seat 12 is configured including: a seat cushion 12C on which an occupant P sits; a seat back 12B that forms a seat back rest of the occupant P; and a headrest 12H that supports a head H of the occupant P. The seat cushion 12C is coupled to a floor F of the cabin C via a well-known seat slide mechanism 13.

A lower end of the seat back 12B is coupled to a rear end of the seat cushion 12C via a well-known reclining mechanism (not shown in the drawings). The headrest 12H is coupled to an upper end of this seat back 12B. Moreover, a three point type seatbelt device 12S for restraining the occupant P is arranged in this seat 12. Front-rear, left-right, and up-down directions of this seat 12 match the front-rear, left-right, and up-down directions of the vehicle. In other words, this seat 12 is disposed facing a front of the vehicle.

(Configuration of Multidirectional Air Bag Device)

The multidirectional air bag device 20 is a device for protecting the occupant P of the seat 12 from various forms of collisions, and is provided in the headrest 12H of the seat 12. As appropriately shown in FIGS. 1 to 4, the multidirectional air bag device 20 includes a multidirectional air bag 30 and an inflator 32. The multidirectional air bag 30 and the inflator 32 are modularized and housed in an air bag case 50 provided in a rear part of the headrest 12H. This air bag case 50 is attached to a seat rearward side of a headrest main body 19 configuring a main body part of the headrest 12H.

As shown in FIGS. 1 to 4, the multidirectional air bag 30 is configured as an integrated bag body that is inflated and deployed so as to cover (surround) the head H of the occupant P from the front, both of left and right sides, and above. Specifically, the multidirectional air bag 30 is configured including: a pair of frame ducts 35 on the left and right that inflate and deploy, with a spacing, in a region of both of left and right sides of and including above the head H; a front deployment part 36 that protects the head H from the front; a pair of side deployment parts 38 that protect the head H from both of left and right sides; and an upper deployment part 48 that protects the head H from above.

The frame duct 35 is provided to each of both sides in a seat width direction with respect to the head H to form a pair, and each of the frame ducts 35 has a configuration of being inflated and deployed substantially in a U shape opening downwardly when viewed from the side. Specifically, the frame duct 35, when viewed from the side in an inflated and deployed state, includes: a rear duct 35R extending upwardly/downwardly along the headrest 12H; an upper duct 35U extending frontwards from an upper end of the rear duct 35R; and a front duct 35F hung from a front end of the upper duct 35U. This frame duct 35 functions to guide a gas from the inflator 32 to the front deployment part 36, the side deployment part 38, and the upper deployment part 48.

The front deployment part 36 is configured including: a front inflating part 40 that includes a portion deployed frontwards of the head H; and a non-inflating part 42 that partitions the front inflating part 40 into a plurality of inflating parts. In this embodiment, the front inflating part 40 is configured including: a pair of up-down inflating parts 40A that are inflated and deployed each having the up-down direction as its longitudinal direction and adjacently in the seat width direction; and a lower inflating part 40L that is positioned below the pair of up-down inflating parts 40A. Inside the lower inflating part 40L is communicated with inside the front duct 35F of the frame duct 35, and inside the pair of up-down inflating parts 40A is communicated with inside the lower inflating part 40L. The pair of up-down inflating parts 40A are configured to be inflated and deployed frontwards (at the front) of the head H, and the lower inflating part 40L is configured to be inflated and deployed frontwards of a chest part B and a shoulder part S of the occupant P.

The non-inflating part 42 is configured including: a non-inflating part 42A that partitions the pair of up-down inflating parts 40A in the seat width direction; and a non-inflating part 42B interposed between each of the up-down inflating parts 40A and the front duct 35F of the frame duct 35. In this embodiment, the non-inflating part 42A is configured by a linear seam extending upwardly/downwardly, and the non-inflating part 42B is configured as a portion surrounded by a looped (endless) seam extending upwardly/downwardly.

The side deployment part 38 is configured including: a side inflating part 44 that is inflated and deployed at a side of the head H; and a non-inflating part 46 that partitions the side inflating part 44 into a plurality of inflating parts. Inside the side inflating part 44 is communicated with inside the front duct 35F of the frame duct 35. In this embodiment, the side deployment part 38 in an inflated and deployed state is surrounded from three directions of rear, upward, and front by the frame duct 35, and forms a substantially rectangular shape when viewed from the side. Moreover, the side deployment part 38 has a size (area) that wraps substantially the whole of the head H when viewed from the side. The side inflating part 44 of this side deployment part 38 is partitioned from the frame duct 35 by a U-shaped seam 46A forming an inverted U shape opening downwardly in a seam configuring the non-inflating part 46. Moreover, the non-inflating part 46 is configured including a front/rear pair of vertical seams 46B that extend from a lower edge of the side inflating part 44 to inside an opening of the U-shaped seam 46A.

The side deployment parts 38 to left and right are configured such that lower ends 44B of each of the side inflating parts 44 contact on the shoulder part S of the occupant P in an inflated and deployed state of the multidirectional air bag 30. There is a configuration where as a result of this contact on the shoulder part S of the lower end 44B of the side inflating part 44, a position in the up-down direction with respect to (the head H of) the occupant P of the multidirectional air bag 30 in an inflated and deployed state is determined. In this positioning state, the multidirectional air bag 30 is configured as follows with respect to the occupant P adopting a normal sitting posture, namely, such that none of the front deployment part 36, the left/right side deployment parts 38, and the later-described upper deployment part 48 contacts the head H (such that a gap is formed).

The upper deployment part 48 is a deployment part that has the seat width direction as its longitudinal direction and is inflated and deployed upwards of the head H. Moreover, the upper deployment part 48 is provided with an unillustrated seam which is a non-inflating part, and a thickness in a seat up-down direction of the upper deployment part 48 is limited by this seam. Inside this upper deployment part 48 is communicated with inside the upper duct 35U of the frame duct 35.

As an example, the multidirectional air bag 30 configured as above is formed as an integrated bag body by an OPW (abbreviation of One Piece Woven). At a normal time, this multidirectional air bag 30 is housed in the air bag case 50 in a folded state. Note that the multidirectional air bag 30 may be formed as an integrated bag body by a method where, for example, peripheral edges of two sheets of fabric are sewn together (Cut & Sew).

The inflator 32 shown in FIG. 1 is a one stage type inflator that includes only one gas generator, and is provided, along with the multidirectional air bag 30, in the air bag case 50. This inflator 32 is configured here as a cylinder type inflator, and is disposed having the seat width direction as its longitudinal direction. This inflator 32 is of a combustion type or a cold gas type, and is connected to a lower end of the previously-mentioned rear duct 35R. This results in a configuration in which a gas for inflation generated from the inflator 32 is supplied to inside the multidirectional air bag 30.

(Configuration of Occupant Protecting ECU)

The occupant protecting ECU 52 (hereafter, referred to simply as "ECU 52") is attached to the floor F of the cabin C downwards of an unillustrated center console disposed on a central side in the vehicle width direction of a front part of the cabin C, for example, and is arranged close to a middle part of the automobile V. The inflator 32 of the multidirectional air bag device 20 is electrically connected to this ECU 52. Moreover, a collision sensor 54 is electrically connected to this ECU 52.

The ECU 52 is configured capable of predicting (forecasting) and detecting various forms of collisions to the automobile V, based on a signal from the collision sensor 54. The collision sensor 54 is configured including at least one of a vehicle-outside camera that photographs a vehicle-outside situation of the automobile V, a millimeter wave radar, and a laser radar, and the ECU 52 is configured capable of predicting and detecting a direction of the collision to the automobile V.

Note that the above-described vehicle-outside camera includes, for example, an unillustrated stereo camera provided close to a center in the vehicle width direction in an upper part of a wind shield glass. Moreover, this stereo camera is configured to photograph a front side of the automobile V and detect a colliding body to the automobile V. In addition, the stereo camera is configured to measure the likes of distance to the detected colliding body or relative speed between the automobile V and the colliding body, and output measurement data to the ECU 52. Moreover, the ECU 52 judges whether a collision of the automobile V is unavoidable, based on the measurement data from the stereo camera.

Moreover, as an example, the collision sensor 54 is configured including: left/right acceleration sensors disposed in left/right front side members (front satellite sensors); an acceleration sensor mounted in the ECU 52 (floor sensor); a pressure sensor or acceleration sensor arranged inside a front side door and a rear side door (in-door sensor); and an acceleration sensor arranged inside a B pillar and inside a C pillar (in-pillar sensor). Furthermore, the collision sensor 54 is configured including a roll-over sensor that detects (unavoidability of) roll-over of the automobile V.

Note that in the present embodiment, when there is a description simply of a "collision", this is assumed to include a front face collision, a rear face collision, a side face collision, and a roll-over (overturning). Moreover, the front face collision and the rear face collision are assumed to include a symmetrical collision (full-wrap collision) and an asymmetrical collision. The symmetrical collision is a form of collision in which an entire surface of the front face or the rear face of the automobile V collides with the colliding body such as another vehicle. Moreover, the asymmetrical collision is a form of collision in which one side on either left or right in the front face or the rear face of the automobile V collides with the colliding body such as another vehicle. This asymmetrical collision includes the likes of an oblique collision, an offset collision, and a minimal-wrap collision. The side face collision is a form of collision in which a side face of the automobile V collides with the colliding body such as another vehicle.

The above-described ECU 52 is configured such that in the case of having predicted a collision of the automobile V, the ECU 52 outputs an actuating signal to the inflator 32 and causes the multidirectional air bag 30 to inflate and deploy. In addition, the ECU 52 is configured to change a timing of causing the multidirectional air bag 30 to inflate and deploy depending on an orientation of the seat 12 with respect to a direction of the predicted collision. Specifically, the ECU 52 is configured such that in the case that the seat 12 is facing an opposite side to a collision side (hereafter, referred to as an "anti-collision side") when the collision of the automobile V has been predicted, the ECU 52 delays a timing of causing the multidirectional air bag 30 to inflate and deploy more compared to in the case that the seat 12 is not facing the anti-collision side (including the case that the seat 12 is facing the collision side).

Figure 5:
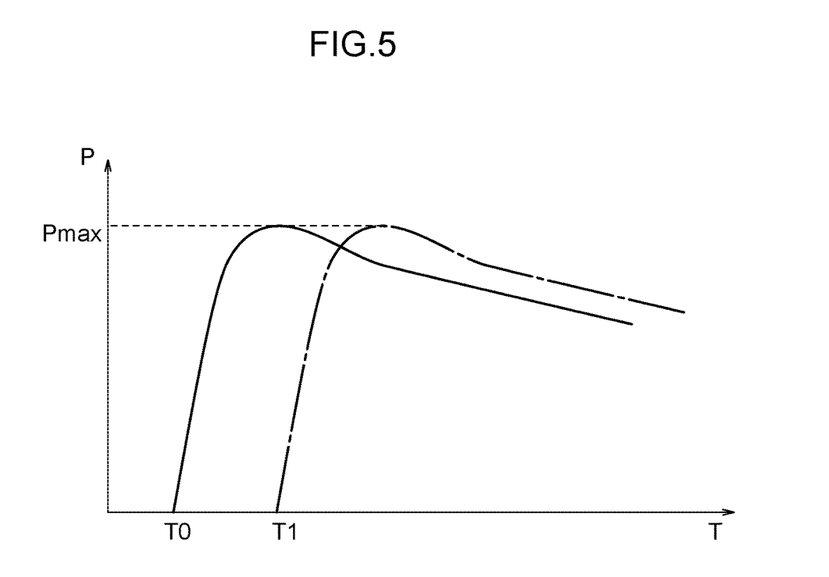
FIG. 5 is a chart showing a relationship between internal pressure of the multidirectional air bag and time from collision detection.

That is, the ECU 52, in the case of having predicted a front face collision of the automobile V, outputs the actuating signal to the inflator 32 at a time point T0 (refer to FIG. 5) that the ECU 52 has detected the front face collision, because the seat 12 is not facing the anti-collision side (rear side of the vehicle). Similarly, the ECU 52, also in the case of having predicted a side face collision or roll-over of the automobile V, outputs the actuating signal to the inflator 32 at the time point T0 that the ECU 52 has detected the side face collision or roll-over, because the seat 12 is not facing the anti-collision side (is facing the front of the vehicle).

On the other hand, the ECU 52, in the case of having predicted a rear face collision of the automobile V, outputs the actuating signal to the inflator 32 at a time point T1 (refer to FIG. 5) after a predetermined delay time (for example, a few milliseconds to a few tens of milliseconds) has passed from the time point T0 that the ECU 52 has detected the rear face collision, because the seat 12 is facing the anti-collision side. As shown in this FIG. 5, a timing that internal pressure P of the multidirectional air bag 30 reaches a maximum value Pmax is later in the case that the inflator 32 has been actuated at the time point T1 after the delay time has passed (refer to dot-chain line of FIG. 5), compared to in the case that the inflator 32 has been actuated at the collision detection time point T0 (refer to solid line of FIG. 5).

Note that a configuration is not limited to the inflator 32 being actuated at or later than the time point T0 that the ECU 52 has detected the collision, and it is possible to adopt a configuration in which the inflator 32 is actuated at a time point that the ECU 52 has judged the collision to be unavoidable, that is, at a time point before the collision is detected. In addition, it is possible to adopt a configuration in which the ECU 52 changes the above-described delay time, depending on the likes of input load (collision load) to the automobile V assumed from the likes of a size of the colliding body detected by the collision sensor 54, or relative speed (collision speed) with respect to the colliding body. Moreover, it is possible to adopt a configuration in which the timing that the ECU 52 actuates the inflator 32 is made different in the respective cases that the predicted collision is a front face collision, a side face collision, or a roll-over. In addition, it is possible to adopt a configuration in which the timing that the ECU 52 actuates the inflator 32 is made different depending on which of a driving seat side and a passenger seat side (which of a near side and a far side) the side face collision has been predicted or detected.

Moreover, in the present embodiment, the ECU 52 is configured to delay inflation and deployment timing of the multidirectional air bag 30 by delaying actuation timing of the one stage type inflator 32, but is not limited to this. That is, when, for example, the inflator 32 is a two stage type inflator (a so-called dual stage inflator) including two gas generators, there will be a configuration in which actuation timing of the second stage gas generator is changed depending on the orientation of the seat 12 with respect to the collision direction.

Figure 6:
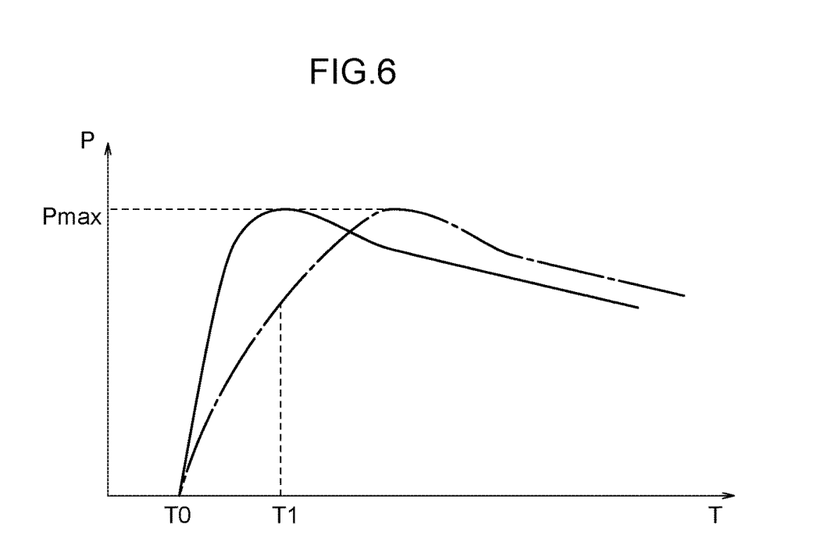
FIG. 6 is a chart showing a relationship between internal pressure of the multidirectional air bag and time from collision detection, in the case that the inflator is a dual stage inflator.

Specifically, the ECU 52, in the case of having predicted a front face collision, a side face collision, or a roll-over of the automobile V, outputs actuating signals to the first stage and the second stage gas generators at a time point T0 (refer to FIG. 6) that the ECU 52 has detected the front face collision, the side face collision, or the roll-over. On the other hand, the ECU 52, in the case of having predicted a rear face collision of the automobile V, outputs an actuating signal to the first stage gas generator at the time point T0 that the ECU 52 has detected the rear face collision, and outputs an actuating signal to the second stage gas generator at a time point T1 (refer to FIG. 6) after a delay time has passed. As shown in FIG. 6, a timing that internal pressure P of the multidirectional air bag 30 reaches a maximum value Pmax is later in the case that the first stage gas generator has been actuated at the time point T0 that the ECU 52 has detected the rear face collision and the second stage gas generator has been actuated at the time point T1 after the delay time has passed (refer to dot-chain line of FIG. 6), compared to in the case that the inflator 32 has been actuated at the collision detection time point T0 (refer to solid line of FIG. 6).

(Operations and Effects)

Next, operations and effects of the present embodiment will be described with reference to a control flow of the ECU 52 shown in FIG. 4. Note that in FIG. 4, the multidirectional air bag 30 is described as a "multidirectional AB".

First, in step S10, the ECU 52 judges whether there is a possibility of a collision in the automobile V or not, based on an output of the collision sensor 54. In the case of an affirmative judgment, the control flow proceeds to step S12, and in the case of a negative judgment, a processing in step S10 is repeated.

In step S12, the ECU 52 judges whether the seat 12 is facing the anti-collision side or not. In the case of a negative judgment, the control flow proceeds to step S14, and in the case of an affirmative judgment, the control flow proceeds to step S16.

In step S14, the ECU 52, as a result of having judged that the seat 12 is not facing the anti-collision side, actuates the inflator 32 at a timing that the ECU 52 has detected the collision of the automobile V, and causes the multidirectional air bag 30 to inflate and deploy. When this processing in step S14 has been completed, control (a program: hereafter, the same) is ended.

On the other hand, in step S16, the ECU 52, as a result of having judged that the seat 12 is facing the anti-collision side, actuates the inflator 32 at a timing after a certain delay time has passed from the time point that the ECU 52 has detected the collision of the automobile V, and causes the multidirectional air bag 30 to inflate and deploy. When this processing in step S16 has been completed, control is ended.

Now, in the case that the seat 12 is facing the anti-collision side during the collision of the automobile V, an upper body of the occupant P, after having once moved to a seat back 12B and headrest 12H side (collision side), moves (rebounds) to the anti-collision side due to a reaction force from the seat back 12B and the headrest 12H. Therefore, in the case that the seat 12 is facing the anti-collision side, a timing that the head H of the occupant P should be protected by the multidirectional air bag 30 becomes later compared to in the case that the seat 12 is facing the collision side.

In this regard, in the present embodiment, in the case that the seat 12 is facing the anti-collision side when the ECU 52 has predicted the collision of the automobile V, the ECU 52 delays the timing of causing the multidirectional air bag 30 to inflate and deploy more compared to in the case that the seat 12 is facing the collision side. As a result, the timing that the multidirectional air bag 30 inflates and deploys (the timing that internal pressure becomes maximum) and a timing that the upper body of the occupant P rebounds can be matched, hence the head H of the occupant P can be protected (caught) by the multidirectional air bag 30 with an appropriate timing. As a result, the head H of the occupant P can be effectively protected by the multidirectional air bag 30.

Moreover, in the present embodiment, the ECU 52 delays inflation and deployment of the multidirectional air bag 30 by delaying the actuation timing of the one stage type inflator 32. As a result, inflation and deployment timing of the multidirectional air bag 30 can be delayed by a simpler configuration compared to when inflation and deployment of the multidirectional air bag 30 is delayed using, for example, a dual stage inflator.

Next, other embodiments of the present disclosure will be described. Note that configurations and operations that are basically similar to those of the above-described first embodiment will be assigned with the same reference symbols as in the above-described first embodiment, and descriptions thereof will be omitted.

<Second Embodiment>

Figure 7:
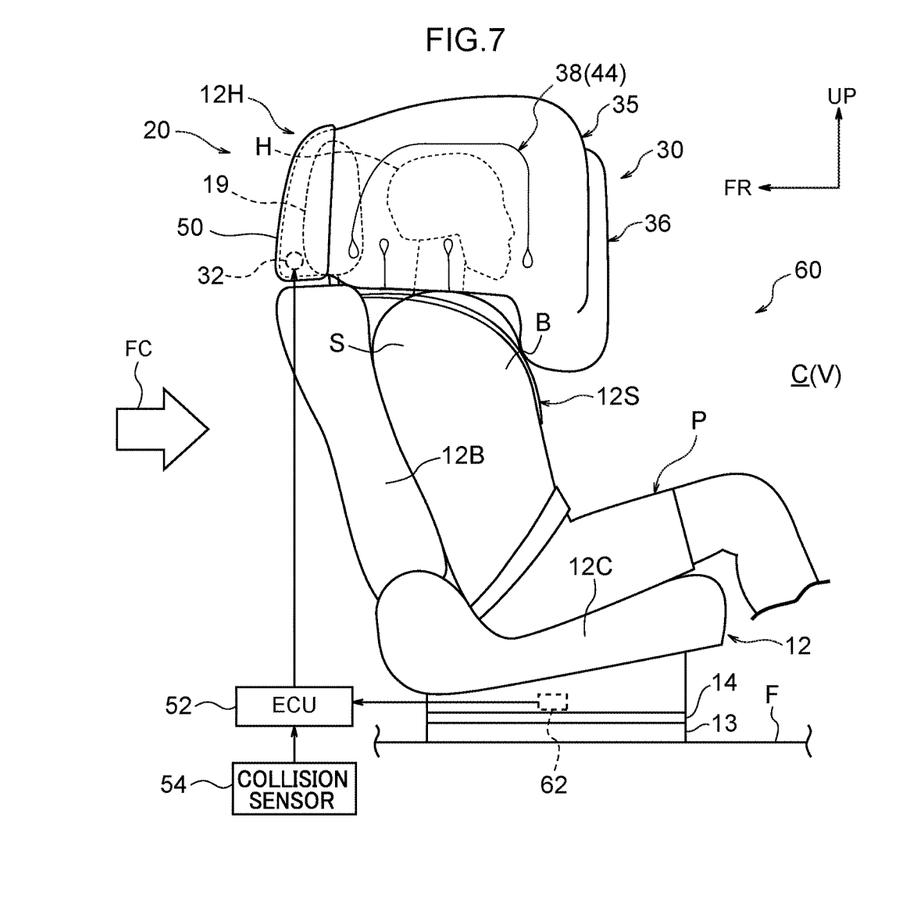
FIG. 7 is a side view of inside a cabin of an automobile applied with an occupant protecting device according to a second embodiment of the present disclosure, seen from a left side of a vehicle, and is a view showing a state where a multidirectional air bag has been inflated and deployed from a front seat directed to a rear of the vehicle.
Figure 8:
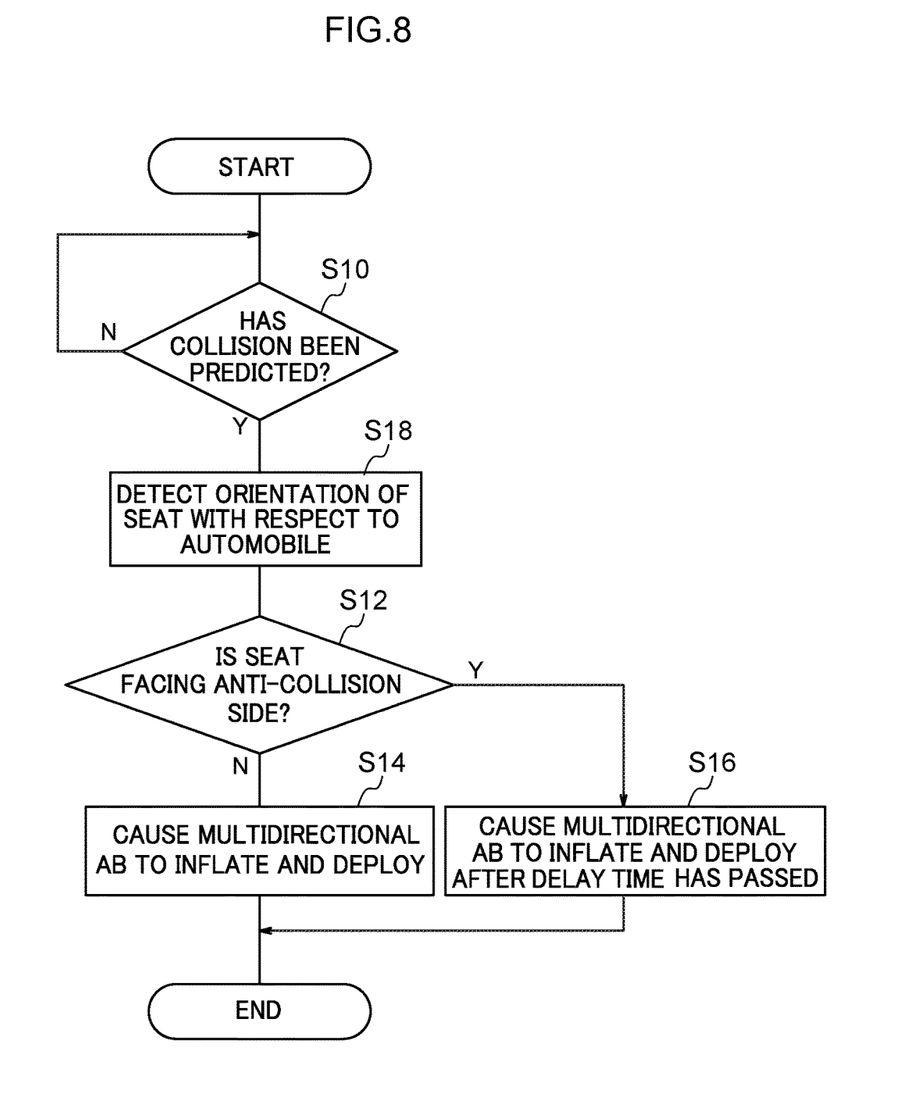
FIG. 8 is a flowchart showing a control flow due to an occupant protecting ECU included in the occupant protecting device according to the second embodiment.

FIG. 7 shows a side view of inside the cabin C of the automobile V applied with an occupant protecting device 60 according to a second embodiment of the present disclosure, seen from a left side of the vehicle. Moreover, a flowchart of FIG. 8 shows a control flow of the ECU 52 included in the occupant protecting device 60. This embodiment is basically configured similarly to the above-described first embodiment, but differs in the following points.

In this embodiment, the seat cushion 12C is coupled to the floor F of the cabin C via the seat slide mechanism 13 and a turntable 14. The turntable 14 is configured as a manual type, for example, and is configured such that by operating an unillustrated lock release lever, the seat cushion 12C, that is, the seat 12 can be rotated around an axis in the up-down direction of the vehicle. As a result, the seat 12 is configured such that at least its front-rear orientation can be changed with respect to the automobile V. Specifically, the turntable 14 has a configuration where it can adopt a front-orientated state (refer to FIG. 1) in which the seat 12 faces the front of the vehicle and a rear-orientated state (state illustrated in FIG. 7) in which the seat 12 faces the rear of the vehicle. Note that the turntable 14 may have a configuration where in addition to being able to adopt the above-described front-orientated state and reversely-seated state, it can adopt a side-orientated state in which the seat 12 faces the vehicle width direction. Moreover, the turntable 14 is not limited to being of the manual type, and may be of an electric type.

Moreover, in this embodiment, the seat 12 is provided with a seat direction detecting sensor 62 that detects the orientation of the seat 12 with respect to the automobile V. This seat direction detecting sensor 62 is electrically connected to the ECU 52, and, together with the ECU 52, configures a control device. An angle measuring instrument such as a potentiometer or a rotary encoder, for example, can be employed as this seat direction detecting sensor 62, but the seat direction detecting sensor 62 is not limited to this. For example, one or a plurality of switches that may be turned ON or OFF depending on the orientation of the seat 12 with respect to the automobile V, or a camera that photographs the seat 12, and so on, may be applied as the seat direction detecting sensor 62.

The ECU 52 is configured such that in the case of having predicted a collision of the automobile V using the collision sensor 54, the ECU 52 judges whether the seat 12 is facing the anti-collision side or not, based on an output from the seat direction detecting sensor 62. The control flow of the ECU 52 will be described below using the flowchart shown in FIG. 8.

In this control flow shown in FIG. 8, step S18 is added to the control flow according to the first embodiment. In this control flow, in the case that an affirmative judgment has been made in step S10, that is, in the case that the ECU 52 has predicted a collision of the automobile V, the control flow moves to step S18.

In step S18, the ECU 52 detects the orientation of the seat 12 with respect to the automobile V based on the output from the seat direction detecting sensor 62. When this processing in step S18 has been completed, the control flow moves to previously mentioned step S12.

In this embodiment, the timing that the ECU 52 causes the multidirectional air bag 30 to inflate and deploy becomes later in the case that when, for example, the automobile V has made a front face collision, the seat 12 is disposed orientated to the rear of the vehicle (refer to FIG. 7), compared to in the case that the seat 12 is disposed orientated to the front of the vehicle. As a result, the occupant P of the seat 12 disposed orientated to the rear of the vehicle can be protected by the multidirectional air bag 30 with an appropriate timing.

<Third Embodiment>

Figure 9:
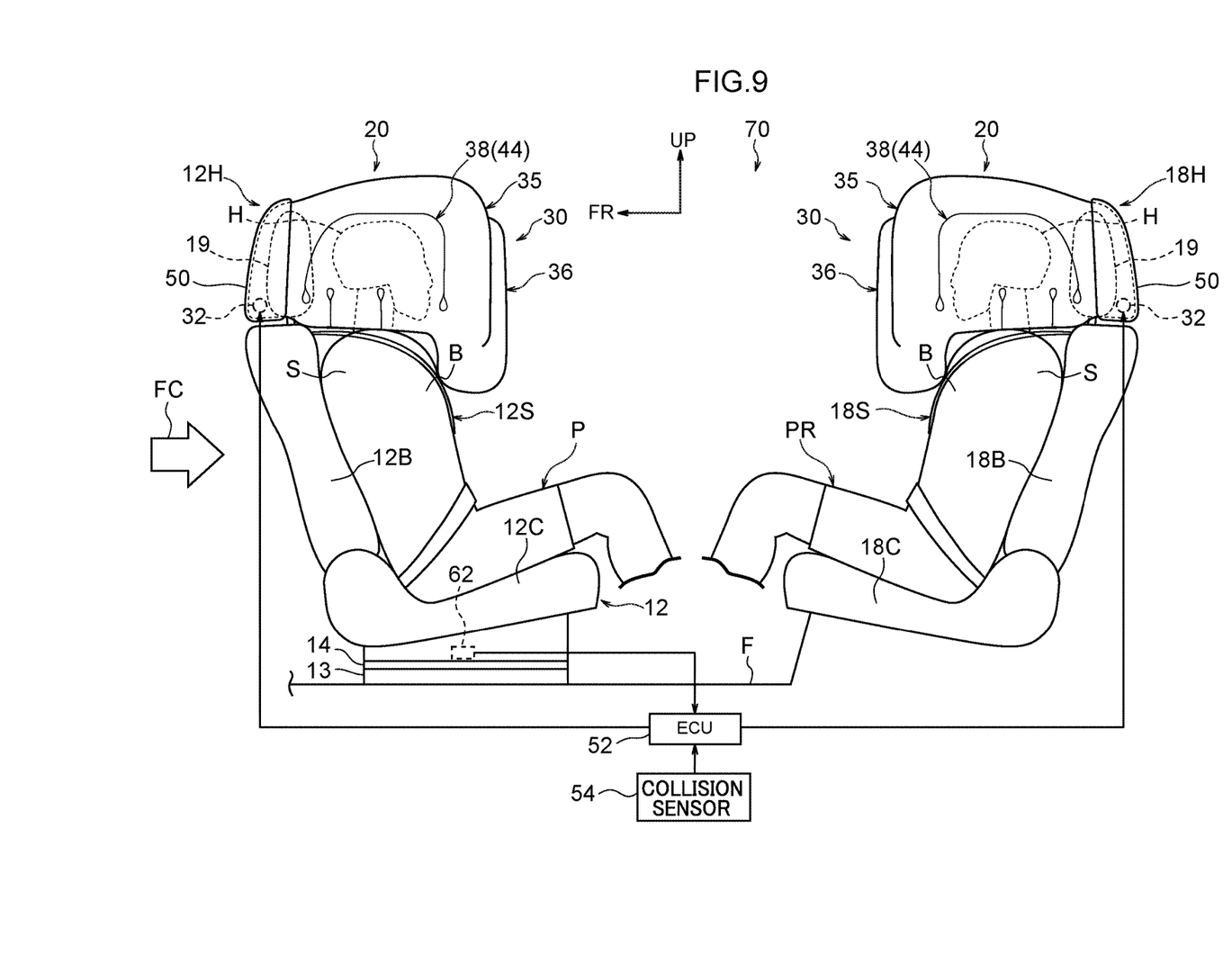
FIG. 9 is a side view of inside a cabin of an automobile applied with an occupant protecting device according to a third embodiment of the present disclosure, seen from a left side of a vehicle, and is a view showing a state where multidirectional air bags have been inflated and deployed from a front seat and a rear seat.

FIG. 9 shows a side view of inside the cabin C of the automobile V applied with an occupant protecting device 70 according to a third embodiment of the present disclosure, seen from the left side of the vehicle. In this embodiment, a configuration of the seat 12 is assumed to be similar to in the previously described second embodiment. Moreover, in this embodiment, a rear seat 18 (hereafter, referred to simply as "seat 18") acting as a rear seat is disposed rearwards in the vehicle of the seat 12. This seat 18 is configured including: a seat cushion 18C on which an occupant PR (hereafter, referred to as "rear seat occupant PR") sits; a seat back 18B that forms a seat back rest of the rear seat occupant PR; and a headrest 18H that supports a head HR of the rear seat occupant PR. A three point type seatbelt device 18S for restraining the rear seat occupant PR is arranged in this seat 18.

In addition, the headrest 18H of this seat 18 is provided with the multidirectional air bag device 20. In other words, this embodiment includes a plurality of the seats 12 and 18 each provided with the multidirectional air bag device 20 (multidirectional air bag 30), and at least one of the plurality of seats 12 and 18 (here, the seat 12) is configured such that at least its front-rear orientation is changeable with respect to the automobile V. Moreover, the ECU 52 is electrically connected to the inflator 32 of the multidirectional air bag device 20 provided in the seat 18.

Figure 4:
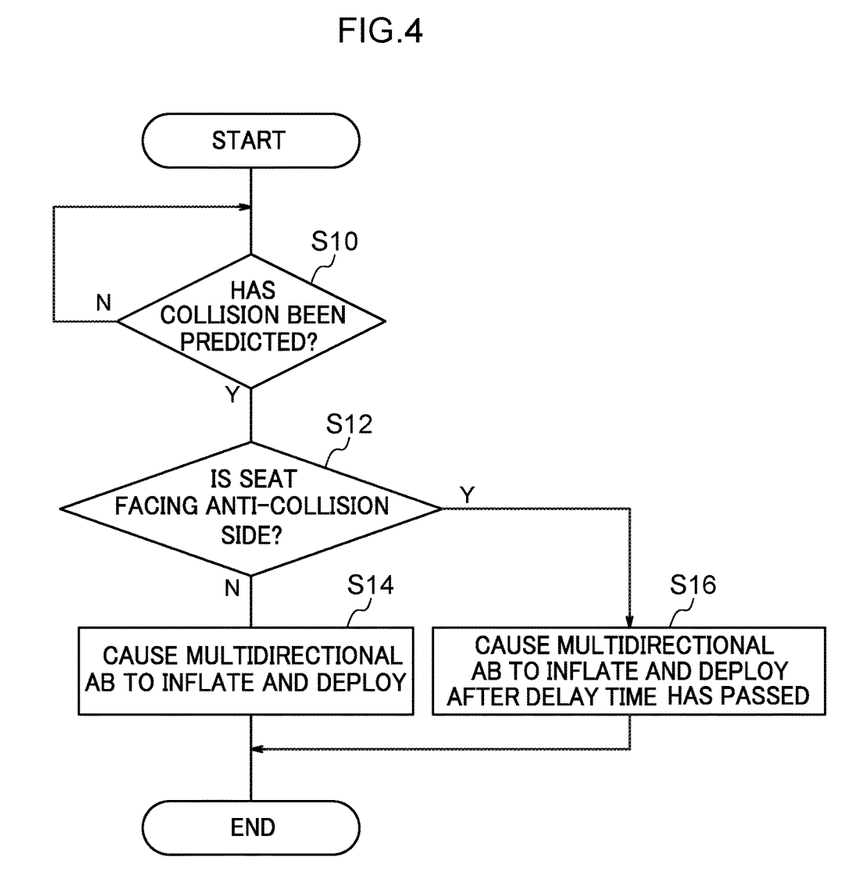
FIG. 4 is a flowchart showing a control flow due to an occupant protecting ECU included in the occupant protecting device according to the first embodiment.

In this embodiment, the ECU 52 controls the multidirectional air bag device 20 of the seat 12 according to the control flow shown in FIG. 8, and controls the multidirectional air bag device 20 of the seat 18 according to the control flow shown in FIG. 4. Therefore, in the case that, for example, the seat 12 is disposed orientated to the rear of the vehicle and the seat 18 is orientated to the front of the vehicle when the automobile V has made a front face collision (state illustrated in FIG. 9), the ECU 52 causes the multidirectional air bag 30 of the seat 12 to inflate and deploy later than the multidirectional air bag 30 of the seat 18. As a result, rise of internal pressure of the cabin C can be suppressed more compared to in the case that all of the multidirectional air bags 30 inflate and deploy simultaneously. As a result, ears, and so on, of the occupants P and PR can be protected from a sudden rise of internal pressure of the cabin C.

(Supplementary Description of Embodiments)

The previously described third embodiment showed an example in which the automobile V (vehicle) was provided with a pair of front and rear seats 12 and 18. However, the present disclosure is not limited to this, and it is possible to adopt a configuration in which the vehicle is provided with three or more seats each provided with the multidirectional air bag.

Moreover, each of the previously described embodiments adopted a configuration in which the headrest 12H was coupled to the upper end of the seat back 12B. However, the present disclosure is not limited to this, and it is possible to adopt a configuration in which the headrest 12H is provided integrally with the upper end of the seat back 12B. Moreover, each of the previously described embodiments showed an example where the multidirectional air bag 30 was housed in the headrest 12H, but the present embodiment is not limited to this. For example, it is possible to adopt a configuration in which part or all of the multidirectional air bag 30 is housed in the upper end of the seat back 12B.

In addition, each of the previously described embodiments showed an example where the seat 12 was configured as the driving seat of the automobile V, but the present disclosure is not limited to this. For example, the seat according to the present disclosure may be a passenger seat of the vehicle, or may be a seat in second and higher numbered columns of a seat layout of three or more columns.

Moreover, each of the previously described embodiments adopted a configuration in which the multidirectional air bag 30 included a pair of left and right frame ducts 35, the front deployment part 36, a pair of left and right side deployment parts 38, and an upper deployment part 48. However, the present disclosure is not limited to this, and the configuration of the multidirectional air bag 30 may be appropriately changed. For example, it is possible to adopt a configuration where the upper deployment part 48 has been omitted.

In addition, each of the previously described embodiments adopted a configuration where in step S10, the ECU 52 predicted a collision of the automobile V. However, the present disclosure is not limited to this, and it is possible to adopt a configuration where in step S10, the ECU 52 detects the collision of the automobile V.

Moreover, the above-described second and third embodiments adopted a configuration where in step S18 after step S10, the ECU 52 detected the orientation of the seat 12 with respect to the automobile V. However, the present disclosure is not limited to this, and it is possible to adopt a configuration in which the ECU 52 detects the orientation of the seat 12 with respect to the automobile V earlier than step S10.

In addition, it goes without saying that the present disclosure can be implemented making a variety of modifications in a range not departing from the spirit of the present disclosure.

What is claimed is:

1. An occupant protecting device comprising:
   a seat provided in a vehicle, the seat including a seat cushion, a seat back, and a headrest, and the seat being provided with an air bag that inflates and deploys at least to a front and both of left and right sides of a head of a seated occupant; and
   a control device that in the case of having detected or predicted a collision of the vehicle, causes the air bag to inflate and deploy, and in the case that the seat is facing an opposite side to a collision side when the collision has been detected or predicted, delays a timing of causing the air bag to inflate and deploy more compared to in the case that the seat is facing the collision side, wherein
   the device comprises a plurality of the seats, at least one of the plurality of seats is configured such that at least its front-rear orientation can be changed with respect to the vehicle, and
   the control device includes a seat direction detecting sensor that detects the orientation of the at least one seat with respect to the vehicle.

2. The occupant protecting device according to claim 1, further comprising a collision sensor electrically connected to the control device, wherein the control device detects or predicts the collision of the vehicle based on a signal from the collision sensor.

3. The occupant protecting device according to claim 1, wherein the timing is a timing that internal pressure of the air bag becomes maximum.

4. An occupant protecting device comprising:

a seat provided in a vehicle, the seat including a seat cushion, a seat back, and a headrest, and the seat being provided with an air bag that inflates and deploys at least to a front and both of left and right sides of a head of a seated occupant; and a control device that in the case of having detected or predicted a collision of the vehicle, causes the air bag to inflate and deploy, and in the case that the seat is facing an opposite side to a collision side when the collision has been detected or predicted, delays a timing of causing the air bag to inflate and deploy more compared to in the case that the seat is facing the collision side, wherein the control device delays the timing of causing the air bag to inflate and deploy by delaying an actuation timing of an inflator supplying a gas for inflation to the air bag.

5. The occupant protecting device according to claim 4, wherein the seat is configured such that at least its front-rear orientation can be changed with respect to the vehicle, and the control device includes a seat direction detecting sensor that detects the orientation of the seat with respect to the vehicle.

6. The occupant protecting device according to claim 4, further comprising a collision sensor electrically connected to the control device, wherein the control device detects or predicts the collision of the vehicle based on a signal from the collision sensor.

7. The occupant protecting device according to claim 4, wherein the timing is a timing that internal pressure of the air bag becomes maximum.

8. An occupant protecting device comprising:

a seat provided in a vehicle, the seat being provided with an air bag that inflates and deploys at least to a front and both of left and right sides of a head of a seated occupant; and a control device that in the case of having detected or predicted a collision of the vehicle, causes the air bag to inflate and deploy, and changes a timing of causing the air bag to inflate and deploy depending on an orientation of the seat with respect to a direction of the detected or predicted collision.

9. The occupant protecting device according to claim 8, further comprising a collision sensor electrically connected to the control device, wherein the control device detects or predicts the collision of the vehicle based on a signal from the collision sensor.

10. The occupant protecting device according to claim 8, wherein the timing is a timing that internal pressure of the air bag becomes maximum.

\* \* \* \* \*